(12) United States Patent
Hosch et al.

(10) Patent No.: US 7,246,697 B2
(45) Date of Patent: Jul. 24, 2007

(54) WASHDOWN CONVEYOR CORNER SECTION WITH REMOVABLE WEAR STRIPS

(75) Inventors: Michael A. Hosch, Oconomowoc, WI (US); Scott M. Hall, Sussex, WI (US); Daniel E. Ertel, Oconomowoc, WI (US)

(73) Assignee: Dorner Mfg. Corp., Hartland, WI (US)

( * ) Notice: Subject to any disclaimer, the term of this patent is extended or adjusted under 35 U.S.C. 154(b) by 6 days.

(21) Appl. No.: 11/267,064

(22) Filed: Nov. 4, 2005

(65) Prior Publication Data

US 2006/0096843 A1    May 11, 2006

Related U.S. Application Data

(60) Provisional application No. 60/625,821, filed on Nov. 8, 2004.

(51) Int. Cl.
*B65G 15/02* (2006.01)
*B65G 15/60* (2006.01)
(52) U.S. Cl. ...................... 198/831; 198/841
(58) Field of Classification Search ............ 198/831, 198/841
See application file for complete search history.

(56) References Cited

U.S. PATENT DOCUMENTS

| | | | | |
|---|---|---|---|---|
| 3,024,893 A | * | 3/1962 | Lambert ................. | 198/836.1 |
| 3,509,984 A | * | 5/1970 | Huffman et al. ......... | 198/415 |
| 3,620,355 A | * | 11/1971 | Jones et al. ............ | 198/831 |
| 3,991,876 A | * | 11/1976 | Schmidt et al. ......... | 198/831 |
| 4,164,283 A | * | 8/1979 | Flajnik .................. | 198/840 |
| 4,930,617 A | * | 6/1990 | Lavoie et al. .......... | 198/692 |
| 4,932,517 A | * | 6/1990 | Johnson ................ | 198/836.1 |
| 5,211,280 A | * | 5/1993 | Houde .................. | 198/836.3 |
| 5,454,467 A | * | 10/1995 | Lago .................... | 198/831 |
| 5,988,362 A | * | 11/1999 | Nakamura et al. ...... | 198/831 |
| 6,585,110 B2 | | 7/2003 | Layne et al. | |

* cited by examiner

*Primary Examiner*—Mark A. Deuble
(74) *Attorney, Agent, or Firm*—Andrus, Sceales, Starke & Sawall, LLP

(57) ABSTRACT

The present invention is a corner section of a conveyor frame assembly that includes removable slide bars and wear strips. The corner section is formed from two side frames of stainless steel joined by multiple stainless steel cross supports. Each of the cross supports is configured to receive a plurality of slide bars formed from a durable plastic material, such as UHMW. The side frames of the corner section also receive a series of support rods positioned to support the lower run of the conveyor belt. Each support rod supports a continuous, lower wear strip and a support puck. The entire corner section can be disassembled and reassembled without the requirement of any external tooling.

15 Claims, 4 Drawing Sheets

WASHDOWN CONVEYOR CORNER SECTION WITH REMOVABLE WEAR STRIPS

CROSS REFERENCE TO RELATED APPLICATIONS

This application is based on and claims priority from U.S. Provisional Patent Application Ser. No. 60/625,821 filed on Nov. 8, 2004.

BACKGROUND OF THE INVENTION

The present invention relates to a conveyor assembly for use in a sanitary application. More specifically, the present invention relates to a corner section for a sanitary conveyor assembly in which the corner section includes stainless steel side frame members and conveyor belt support slide bars and wear strips for supporting both the upper and lower runs of the conveyor belt that can be removed without the use of tools.

Presently, conveyors used in the food processing industry must meet strict standards regarding the construction of the conveyor to avoid areas on the conveyor in which water or food product can collect. In most applications, the conveyor frame assembly is formed from a stainless steel material such that the frame assembly can be easily washed and sanitized to avoid the development of harmful bacteria.

In a typical conveyor assembly, the continuous length of conveyor includes straight conveyor sections and curved sections such that the continuous run of the conveyor belt can travel along a desired path of transportation. Typically, both the curved corner sections and the straight conveyor sections include side rails formed from stainless steel. The stainless steel side rails are rolled into a smooth curve of the desired radius to form curved corner sections. Once the stainless steel side rails are rolled into to the desired radius of curvature, cross support members are positioned between the side rails to form the rigid, corner frame.

Although prior art conveyor frame assemblies function relatively well in a sanitary environment, the wash down of the conveyor frame section typically requires the time consuming disassembly of the conveyor frame assembly prior to wash down. For example, the guide rails and the belt support strips must be removed from the conveyor frame assembly prior to wash down. In addition, if the conveyor belt needs to be removed from the conveyor assembly, various guide members and retaining clips must be removed before the conveyor belt can be removed from the conveyor frame. The amount of time required to wash down the conveyor section disables the conveyor, thereby reducing the operating time of the food processing system.

Therefore, it is desirable to provide a conveyor corner assembly that eliminates the need for separate tools to disassemble the conveyor frame prior to wash down yet provides the required physical structure to allow the corner section to work properly. A further need exists for a corner section that has a visually pleasing appearance without any visible weld lines.

SUMMARY OF THE INVENTION

The present invention relates to a corner section for use with a sanitary conveyor assembly that allows a continuous conveyor belt having an upper and a lower run to transition from straight sections of the sanitary conveyor assembly. The corner section includes inner and outer side frames that each extend from a first end to a second end. Preferably, both the inner side frame and the outer side frame include a series of generally flat facets that are joined to each other at an angle such that the series of flat facets create the desired curvature for the respective side frames. Each flat facet of both the inner side frame and the outer side frame is joined to the adjacent facet along a bend line at an angle. The angle between the adjacent facets of both the inner side frame and the outer side frame define the arc of curvature for the corner section.

The inner and outer side frames are joined to each other by a series of spaced cross supports. Preferably, each of the cross supports is welded to both the inner side frame and the outer side frame to define a corner frame. Specifically, the first end of each of the cross supports is welded to the inner surface of the inner side frame along one of the bend lines between the flat facets. The second end of each cross support is welded to the outer side frame at one of the bend lines between the outer facets. The attachment of the cross supports between the inner and outer side frames at the bend lines increases the strength of the corner frame and hides the weld line to provide a more desirable appearance for each of the side frame members.

In addition to the multiple cross supports, the corner frame includes a first end support and a second end support connected between the respective first and second ends of the inner and outer side frames. The series of cross supports and the first and second end supports support a series of spaced slide rails that each support the upper run of the continuous conveyor belt. Each of the slide rails are removably received within the cross supports and can be removed and replaced without the requirement of any external tooling. Preferably, the slide rails are formed from a durable plastic material, such as UHMW.

In addition to supporting the upper run of the conveyor belt, the corner section also includes a series of support rods that extend between the inner and outer side frames to provide support for the lower run of the conveyor belt. Preferably, the first end of each support rod is removably supported by the inner side frame, while the second end of the support rod is removably supported by the outer side frame. Both ends of each support rod are received within slots formed in the respective inner and outer side frames such that the support rods can be removed and replaced without the requirement of any external tooling.

Each of the support rods receives and supports a lower side rail and at least one support puck. Preferably, both the lower slide rail and the support pucks are formed from a durable plastic material, such as UHMW plastic.

The corner section further includes inner and outer guide rails that are removably attachable to the corner frame without the requirement of any external tooling. Thus, both the inner and outer guide rails can be removed and replaced either due to excessive wear or for cleaning without the requirement of any external tooling.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
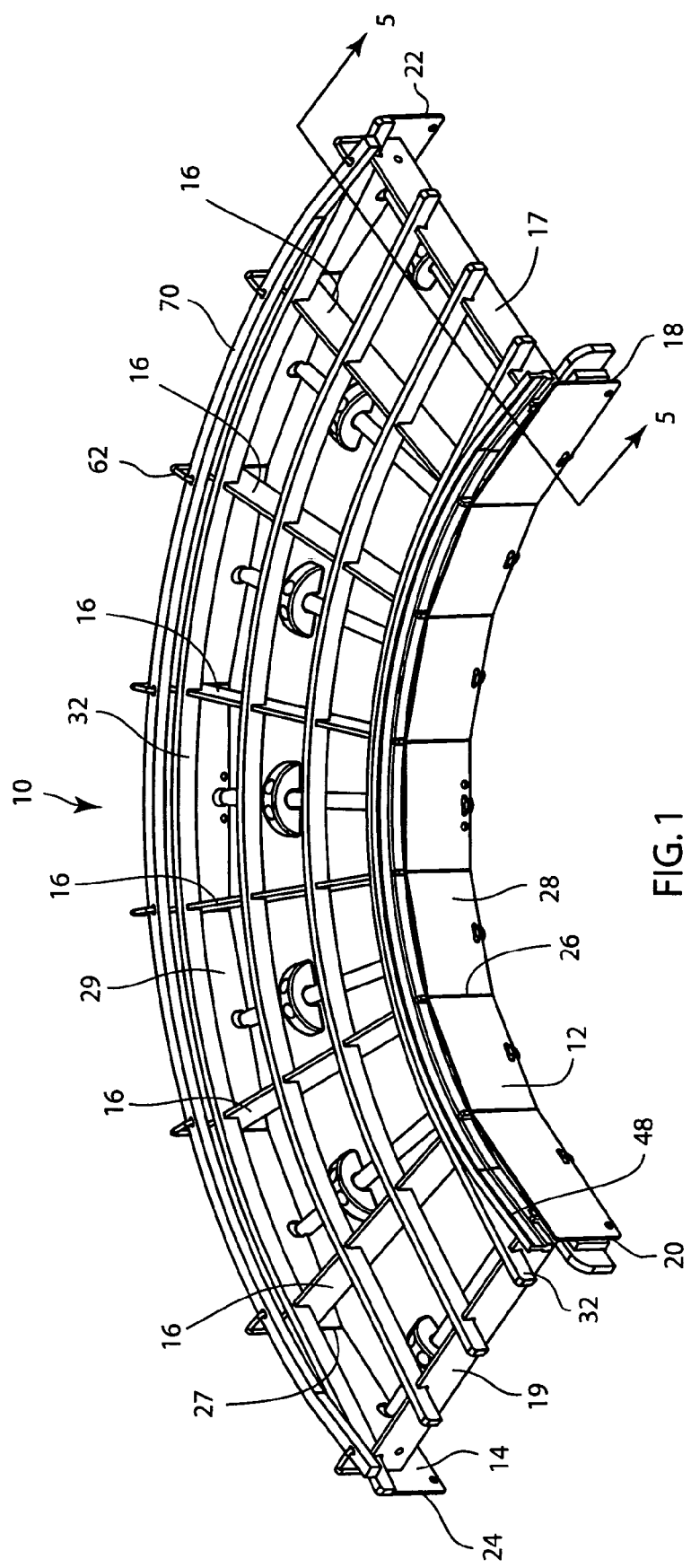
FIG. 1 is a perspective view of the conveyor frame assembly of the present invention with the conveyor belt removed for illustration.

Referring first to FIG. 1, thereshown is a corner section 10 of a conveyor frame assembly constructed in accordance with the present invention. The corner section 10 is configured to receive the top and bottom runs of a continuous conveyor belt (not shown) from a straight conveyor section and provide transition for the conveyor belt into another straight conveyor section. In the embodiment of the invention illustrated in FIG. 1, the corner section 10 is a 90° corner section. However, it is contemplated that other angles for the corner section 10 are contemplated as being within the scope of the present invention.

As illustrated in FIG. 1, the corner section 10 includes an inner side frame 12 and an outer side frame 14 separated from each other by the width of the conveyor belt. As illustrated, the inner side frame 12 and the outer side frame 14 are joined to each other by a series of cross supports 16, a first end support 17 and a second end support 19. Each of the cross supports 16 is preferably welded to an inner surface of both the inner side frame 12 and the outer side frame 14. In the preferred embodiment of the invention, the inner side frame 12, the outer side frame 14, the cross supports 16, the first end support 17 and second end support 19 are all formed from stainless steel.

As illustrated in FIG. 1, the inner side frame 12 is formed from a continuous section of stainless steel that is bent along multiple bend lines 26 to define a curve from a first end to a second end. The multiple bend lines 26 define a series of generally flat inner facets 28. Each of the facets 28 is joined to at least one other adjacent inner facet along the bend 26 at an angle. The angle between adjacent inner facets 28 defines the desired curvature for the inner side frame 12.

Figure 2:
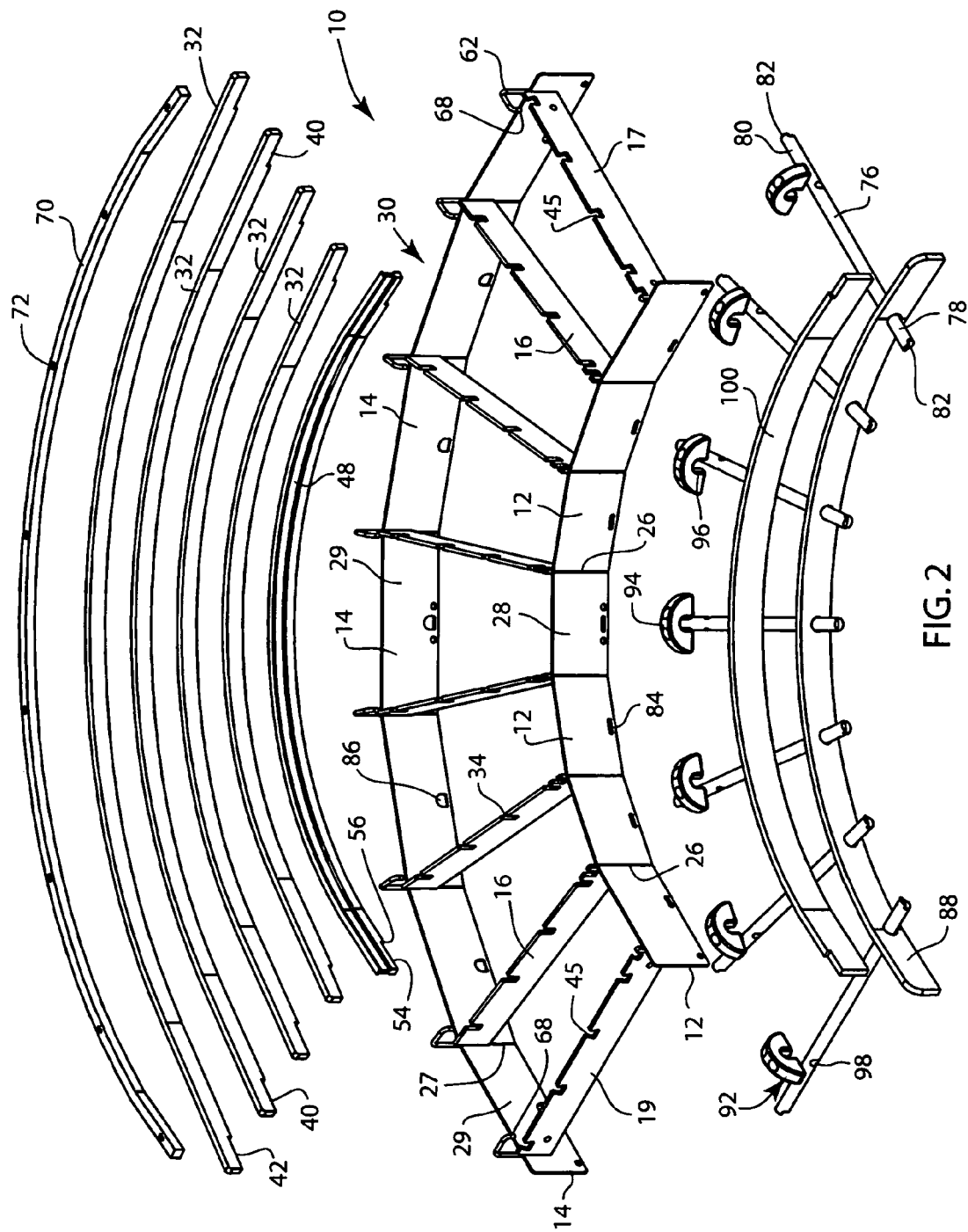
FIG. 2 is an exploded view of the corner conveyor frame assembly.

Referring now to FIG. 2, the outer side frame 14 includes a series of generally flat outer facets 29 joined to each other along a series of bends 27. The series of outer facets 29 are joined to at least one other adjacent outer facet at an angle along one of the bends 27 to define the radius of curvature of the outer side frame 14.

As illustrated in FIG. 2, the number of inner facets 28 formed by the inner side frame 12 is the same as the number of outer facets 29 formed by the outer side frame 14. As discussed, both the inner side frame 12 and the outer side frame 14 are each formed from continuous strips of stainless steel that are bent along multiple, discrete bend lines to create the desired radius of curvature of the respective side frame.

As illustrated in FIG. 2, each of the cross supports 16 has a first end positioned in contact with the inner surface of the inner side frame 12 along one of the bends 26. The second end of each cross support 16 is positioned in contact with the inner surface of the outer side frame 14 and aligned with one of the bends 27. During construction of the corner frame 30, each of the cross supports 16 is welded to the inner side frame 12 along one of the bends 26 and is welded to the outer side frame 14 along one of the bends 27. The alignment of the cross supports 16 between the pair of bends 26,27 aids in the welding process used to attach the cross supports 16 between the side frames 12,14. Specifically, the weld lines between the cross support 16 and the inner and outer side frames 12,14 is disguised by the respective bend 26,27 to provide a more visually pleasing appearance for the corner frame 30.

In addition to the series of cross supports 16, both the first end support 17 and the second end support 19 are welded between the spaced side frames 12,14. As illustrated, both the first end support 17 and the second end support 19 are attached to the inner surfaces of the side frames 12,14 near the respective first and second ends of the side frames 12,14. Unlike the cross supports 16, the end supports 17,19 are each attached between one of the inner facets 28 and one of the outer facets 29 of the respective side frames.

Referring now to FIG. 2, once the series of cross supports 16 and the first and second end supports 17,19 are welded between the inner side frame 12 and the outer side frame 14, the corner frame 30 can received multiple wear strips and guide members to aid in transitioning the conveyor belt around the curved corner frame 30.

As shown in FIGS. 1 and 2, each of the cross supports 16 receives and supports one of a plurality of slide bars 32. In the embodiment of the invention illustrated, the corner section 10 is shown including four separate slide bars 32. However, the specific number of slide bars 32 utilized with the corner section can vary depending upon the width of the conveyor belt being supported by the corner section 10.

Figure 4:
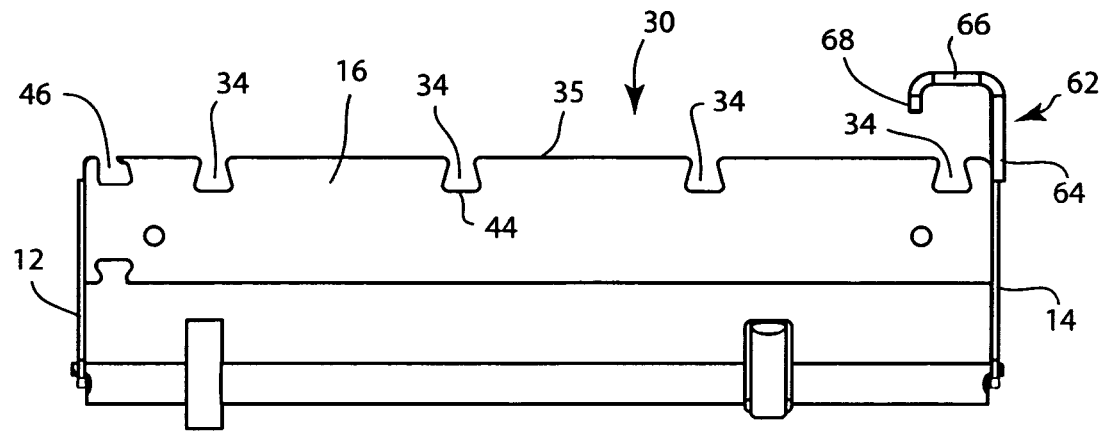
FIG. 4 is an end view of the corner section with the slide rails and wear strips removed.
Figure 5:
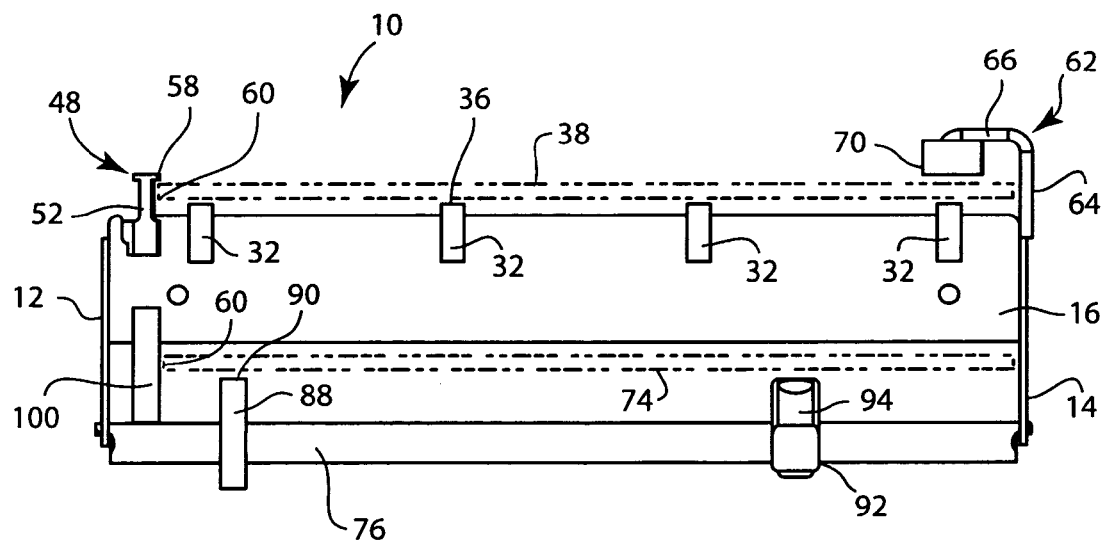
FIG. 5 is an end view similar to FIG. 4 with the slide rails and wear strips mounted to the corner section and further illustrating the position of the conveyor belt.

As best illustrated in FIG. 4, each of the cross supports 16 includes a series of spaced retaining notches 34 extending into the cross support 16 from the top edge 35. Each of the retaining notches 34 is sized slightly larger than the slide bars 32 such that the retaining notches can receive the slide bars, as best illustrated in FIG. 5. Each slide bar 32 includes an upper support surface 36 that contacts an supports the upper run 38 of the moving conveyor belt, as shown in dashed lines in FIG. 5. In the preferred embodiment of the invention, each of the slide bars 32 is formed from a UHMW plastic material that allows the conveyor belt 38 to slide over each of the slide bars 32 and reduces the amount of wear on the conveyor belt.

As illustrated in FIG. 4, each of the retaining notches 34 are evenly spaced across the width of the cross support 16 to provide even support for the upper run of the conveyor belt. Referring back to FIG. 3, before the slide bars 32 are inserted into the spaced cross supports 16, each of the slide bars 32 has a generally straight shape. When the slide bars 32 are bent to be inserted into the retaining notches of the cross supports 16, the material memory of the slide bars 32 flexes the slide bars outward into the outer wall of the retaining notch 34, which aids in securing the slide bars 32 within the spaced cross supports 16.

In the embodiment of the invention illustrated in FIG. 2, each of the slide bars 32 includes a reduced height notch 40 formed at each of its ends. The notch 40 on each end of the slide bar 32 is received within one of the retaining notches 45 formed in the first and second end supports 17,19. The retaining notches 45 formed in each of the end supports 17,19 have a depth less than the corresponding retaining notches 34 formed in the series of cross supports 16.

When the series of slide bars 32 are supported by the corner frame 30, the shoulder 42 formed on each end of the slide bar 32 contacts an inner face of one of the first and second end supports 17,19 to prevent the slide bar from moving laterally with respect to the corner frame. However, since no connectors or other components are used to secure the slide bars 32, the slide bars 32 can be simply removed from the corner frame 30 by lifting the respective slide bar 32 from the series of spaced cross supports 16 and the end supports 17,19.

Referring back to FIG. 4, the cross support 16 includes an inner retaining notch 46 depending from the top edge 35. The inner retaining notch 46 is sized to receive an inner wear strip 48, as best illustrated in FIGS. 1 and 2. As illustrated in FIGS. 1 and 2, each of the cross supports 16 receives a lower portion of the inner wear strip 48. Like the slide bars 32, the inner wear strip 48 is formed in a generally straight shape prior to attachment of the wear strip 48 to the corner frame 30. The material memory of the inner wear strip 48 flexes the wear strip 48 outward and creates a friction force that aids in retaining the wear strip 48 in the position shown in FIG. 1.

Figure 3:
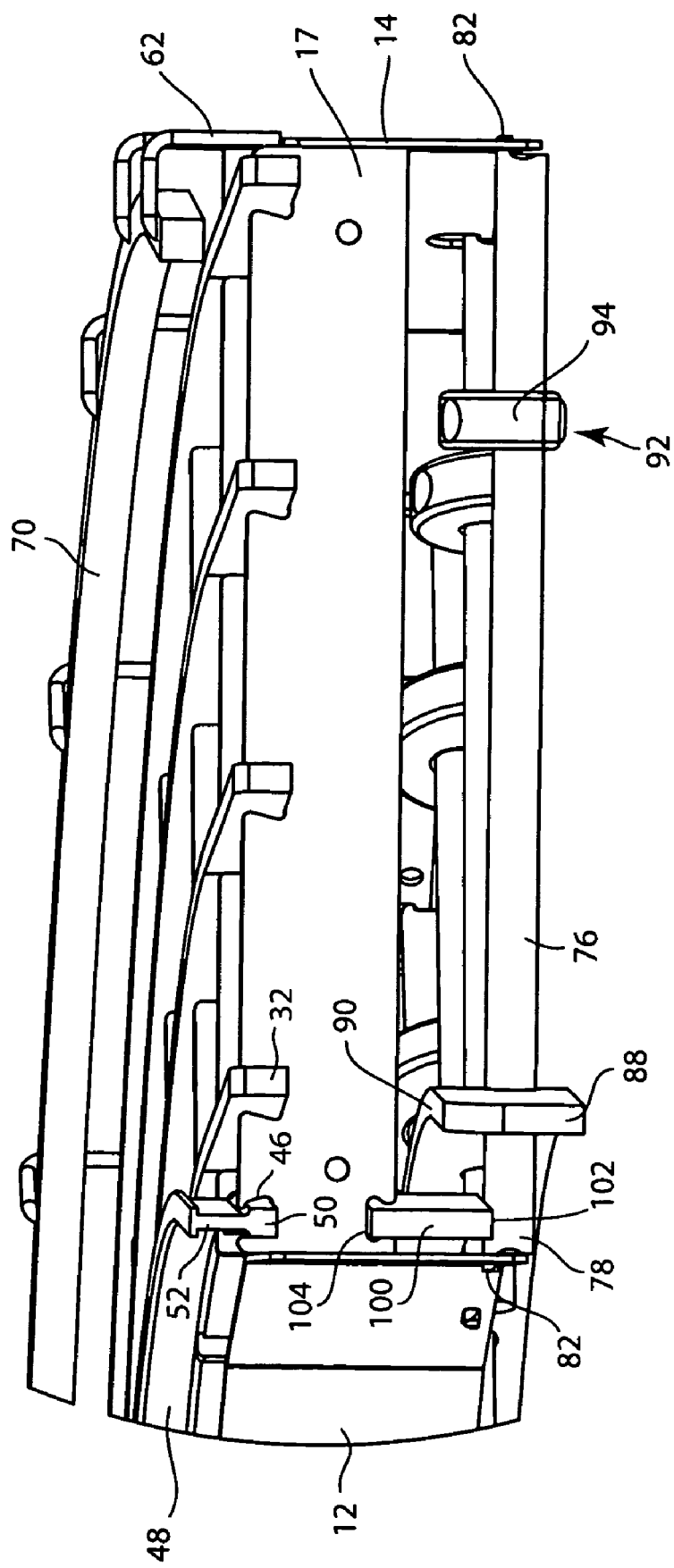
FIG. 3 is a magnified end view of the corner section of the conveyor frame assembly.

Referring now to FIG. 3, the inner wear strip 48 includes a lower base 50 that is received within the retaining notch 46. The lower base 50 has an expanded thickness as compared to the main body 52 to prevent the inner wear strip 48 from being lifted out of the retaining notch 46. As can be understood in FIG. 3, the inner wear strip 48 is installed onto the corner frame by sliding the inner wear strip along the length of the corner section from the first end section 17, through the cross supports 16 and finally into the second end support 19.

Referring back to FIG. 2, each end of the inner wear strip 48 includes a removed notch 54 defined by a shoulder 56 that engages a reduced height retaining notch 46 formed in the first and second end supports 17,19 to prevent the inner wear strip 48 from sliding along the length of the corner frame 30.

Referring now to FIG. 5, the inner wear strip 48 includes a top lip 58 extending laterally from the main body 52. As illustrated in FIG. 5, the top lip 58 overlies the inner edge 60 of the upper run 38 of the conveyor belt to prevent the conveyor belt from lifting along the inner apex of the corner section.

Referring now to FIGS. 2 and 4, the corner frame 30 includes a series of spaced outer support arms 62 that are each generally aligned with one of the cross supports 16. The outer support arms 62 include an attachment leg 64 securely attached to the outer side frame 14 and a curved top end 66 having an attachment peg 68 that extends vertically downward from the curved top end 66. As can be understood in FIG. 5, the attachment peg 68 is received within an outer guide rail 70.

As illustrated in FIG. 5, the outer guide rail 70 is positioned above the upper run 38 of the conveyor belt to prevent the upper run 38 from lifting off of the series of slide bars 32. In the preferred embodiment of the invention, the outer guide rail 70 is formed from a UHMW plastic material that reduces the amount of wear on the conveyor belt when the conveyor belt contacts the outer guide rail 70. In a preferred embodiment of the invention, the outer guide rail 70 is formed as a straight piece of UHMW plastic material that is bent into configuration shown in FIG. 1. The material memory of the outer guide rail 70 flexes the guide rail 70 outward into contact with each of the support arms 62. Preferably, the attachment peg 68 of each outer support arm 62 is retained by friction within spaced holes 72 formed in the outer guide rail 70, as shown in FIG. 2.

In addition to supporting the upper run of the conveyor belt, the corner section 10 also supports a lower run 74 of the continuous conveyor belt, as best illustrated in FIG. 5. The lower run 74 passes beneath each of the spaced cross supports and between the outer side frame 14 and the inner side frame 12. Referring back to FIG. 2, the corner section 10 includes a series of support rods 76 that each extend between the inner side frame 12 and the outer side frame 14. In the embodiment of the invention illustrated, each of the support rods 76 is a generally cylindrical member formed from stainless steel and extends from an inner end 78 to an outer end 80. Both the inner end 78 and the outer end 80 include an extended support tab 82. The extended support tab 82 formed on the inner end 78 is received and retained within a slot 84 formed in the inner side frame 12, as shown in FIG. 2. The shape of the slot 84 and the support tab 82 prevents the support rod 76 from rotating. The inner side frame 12 includes a series of slots 84 each formed in one of the inner facets 28 and positioned between two of the cross supports 16.

The support tab 82 formed on the outer end 80 of each support rod 76 is received within a corresponding slot 86 formed in the outer side frame. Each of the slots 82 formed on the outer side frame 14 include a curved, semicircular upper surface and a flat bottom edge. The slots 86 are sized such that the support rod 76 can pass through the slot 86 to allow removal of the support rod 76. Each of the slots 86 is formed in one of the outer facets 29 and is spaced along the outer side frame 14 between a pair of cross supports 16. The interaction between the support tabs 82 formed on the second end of each support rod 76 and the slot 86 allows the support rod 76 to be freely removable from between the inner and outer side frames 12,14.

As can best be seen in FIGS. 2 and 3, the inner end 78 of each support rod 76 passes through an opening formed in a lower slide bar 88. The lower slide bar 88 is preferably formed from a straight section of UHMW material that is bent into the curved configuration shown in FIGS. 2 and 3 and includes an upper support surface 90 that contacts and supports the entire length of the lower run of the conveyor belt, as best shown in FIG. 5.

Referring back to FIGS. 2 and 3, each of the support rods 76 receives a support puck 92. Each support puck 92 includes a curved outer surface 94 that, at its apex, contacts and supports the lower run 74 of the conveyor belt. Preferably, each of the support pucks 92 is also formed from UHMW to aid in reducing the amount of wear to the moving continuous conveyor belt.

As shown in FIG. 2, each of the support pucks 92 includes a curved attachment opening 96 having a width less than the diameter of the support rod 76. Each support rod 76 includes a pair of removed notches 98 that lessen the overall thickness of the support rod to receive the attachment opening 96 of the support puck 92. The interaction between the removed notches and the attachment opening 96 prevent the support puck from sliding along the longitudinal length of the support rod 76 while allowing the support puck 92 to be easily removed from the support rod without any tools.

As best illustrated in FIGS. 2 and 3, the corner section further includes a continuous lower wear strip 100. The lower wear strip 100 includes a bottom edge 102 that rests upon the series of spaced support rods 76. The top edge of the lower wear strip 100 is received within a lower retaining notch 104 formed in the cross supports 16 and the first and second end supports 17,19. The lower wear strip 100 is formed from the UHMW material that is bent into the curved shape shown in FIGS. 2 and 3. The material memory of the lower wear strip 100 causes the lower wear strip 100 to flex outward and be securely retained within the lower retaining notches 104. As illustrated in FIG. 5, the lower wear strip 100 contacts the inner edge 60 of the lower run 74 of the continuous conveyor belt to reduce wear to the inner edge during the transition of the conveyor belt around the curved corner section.

In the preferred embodiment of the invention, the plurality of slide bars 32, the inner wear strip 48, the lower slide bar 88, each of the support pucks 92, the outer guide rail 70 and the lower wear strip 100 are all formed from UHMW plastic material. As previously described, each of these members are formed as a continuous straight section and are bent to define the curved shape of the corner section 10. In the preferred embodiment of the invention, each of these members is formed having a symmetrical cross section such that when the member is bent to correspond to the curve of the conveyor section, the member bends uniformly and does not have a tendency to rise up or extend downward.

As best shown in FIG. 5, when the corner section 10 needs to be cleaned and sanitized, the conveyor belt may be removed from the corner section 10 without any additional tooling. To remove the conveyor belt, the upper run is initially pushed laterally toward the outer side frame 14 until the inner edge 60 clears the top lip 58 of the inner wear strip 48. Once the inner edge 60 moves out from beneath the top lip 58, the inner edge of the conveyor belt can be lifted above the inner wear strip 48 and the conveyor belt is slid laterally toward the inner side frame 12 until the opposite side edge clears the outer guide rail 70. Thus, the removal of the conveyor belt from the corner section 10 does not require any additional tooling or the removal of multiple mounting clips.

Once the conveyor belt has been removed, the outer guide rail 70 can be removed from the series of outer support arms 62. Each of the slide bars 32 can be lifted from between the spaced cross supports 16. The inner wear strip 48 can be slid out of contact with the spaced cross supports.

Once the support members for the upper run of the conveyor belt have been removed, each of the support rods 76 can be lifted and pushed partially through the slot 86 formed in the outer side frame 14 until the support tab 82 formed on the inner end of the support rod 76 leaves the slot 84 formed in the inner side frame 12. Once each of the support rods 76 has been removed from between the inner and outer side frames 12,14, the support pucks 92 can be lifted off the respective support rods and the support rods can be pulled from the lower slide bar 88. Thus, the entire corner section 10 can be completely disassembled for washing and sanitization without the requirements of any additional tools.

Once the various components have been removed from the corner frame, 30 which includes the inner side frame 12, outer side frame 14, the series of spaced cross supports 16 and the first and second end supports 17,19, the stainless steel conveyor frame can also be washed and sanitized. Once again, the entire sanitation process can be completed without the requirement of any tooling.

As described above, each of the wear elements of the corner section 10 can also be removed and replaced without the requirement of any additional tools. Since each of the slide bars 32, the inner wear strip 48, the outer guide rail 70, the lower slide bar 88 and lower wear strip 100 are preferably formed from UHMW, each of these components expands or contracts depending upon the temperature of the environment in which the corner section 10 is being used. In many sanitary applications, the corner section can be used in areas that are refrigerated. In the same conveyor application, a corner section can be used in heated areas. Thus, the corner section 10 of the present invention can be used over a wide range of temperatures, for example between 32° F. to approximately 150° F. Since each of the wear elements identified above are not held in place by any bolts or fasteners, each of the elements formed from UHMW can expand or contract depending upon the temperature surrounding the corner section.

Various alternatives and embodiments are contemplated as being within the scope of the following claims particularly pointing out and distinctly claiming the subject matter regarded as the invention.

What is claimed is:

1. A corner section for use with a sanitary conveyor assembly having a continuous conveyor belt with an upper run and a lower run, the corner section comprising:
   a curved inner side frame extending from a first end to a second end, the inner side frame including a plurality of generally flat inner facets each joined to at least one other inner facet at an angle along an inner bend line;
   a curved outer side frame extending from a first end to a second end, the outer side frame including a plurality of generally flat outer facets each joined to at least one other outer facet at an angle along an outer bend line; and
   a plurality of cross supports each having a first end connected to the inner side frame at one of the inner bend lines and a second end connected to the outer side frame at one of the outer bend lines.

2. The corner section of claim 1 wherein the inner side frame, the outer side frame and the plurality of cross supports are formed from stainless steel.

3. The corner section of claim 1 further comprising:
   a first end support connected between the first end of the inner side frame and the first end of the outer side frame; and
   a second end support connected between the second end of the inner side frame and the second end of the outer side frame.

4. The corner section of claim 3 further comprising a plurality of slide bars each extending from the first end support to the second end support and supported by the plurality of cross supports, wherein the slide bars are positioned to support the upper run of the conveyor belt.

5. The corner section of claim 1 wherein the corner section includes the same number of flat inner facets and flat outer facets.

6. The corner section of claim 1 further comprising a plurality of support rods each having a first end supported by one of the flat inner facets and a second end supported by one of the flat outer facets, wherein the support rods are positioned to support the lower run of the conveyor belt.

7. The corner section of claim 6 further comprising a continuous lower slide bar supported by the plurality of support rods and extending from the first end support to the second end support.

8. The corner section of claim 6 wherein the first end of each support rod is removably received in an inner slot formed in one of the flat inner facets and the second end of each support rod is removably received in an outer slot formed in one of the flat outer facets.

9. The corner section of claim 6 further comprising a support puck removably mounted on each of the support rods and positioned to support the lower run of the conveyor belt.

10. A corner section for use with a sanitary conveyor assembly having a continuous conveyor belt with an upper run and a lower run, the corner section comprising:
    a curved inner side frame extending from a first end to a second end;
    a curved outer side frame extending from a first end to a second end;
    a plurality of cross supports each having a first end connected to the inner side frame and a second end connected to the outer side frame;
    a first end support connected between the first end of the inner side frame and the first end of the outer side frame;
    a second end support connected between the second end of the inner side frame and the second end of the outer side frame;
    a plurality of slide bars each extending from the first end support to the second end support and supported by the plurality of cross supports, wherein the slide bars are positioned to support the upper end of the conveyor belt;

a plurality of support rods each having a first end supported by the inner side frame and a second end supported by the outer side frame; and at least one support puck removably mounted on each of the support rods such that the support pucks support the lower run of the conveyor belt.

11. The corner section of claim 10 wherein each of the cross supports, the first end support and the second end support are welded to both the inner side frame and the outer side frame.

12. The corner section of claim 11 wherein each of the slide bars are secured without any connectors.

13. The corner section of claim 10 further comprising a continuous lower slide bar supported by the plurality of support rods and extending from the first end support to the second end support.

14. The corner section of claim 10 wherein the first end of each support rod is removably received in an inner slot formed in the inner side frame and the second end of each support rod is removably received in an outer slot formed in the outer side frame.

15. The corner section of claim 10 further comprising:

a plurality of outer support arms each attached to the outer side frame and aligned with one of the cross supports; and an outer guide rail supported between each of the outer support arms, the outer guide rail being positionable above the upper run of the conveyor belt.

* * * * *